US007269420B2

United States Patent
Heo et al.

(10) Patent No.: US 7,269,420 B2
(45) Date of Patent: Sep. 11, 2007

(54) SYSTEM AND METHOD FOR RETRANSMITTING UPLINK DATA IN A CODE DIVISION MULTIPLE ACCESS COMMUNICATION SYSTEM

(75) Inventors: Youn-Hyoung Heo, Suwon-si (KR); Ju-Ho Lee, Suwon-si (KR); Yong-Jun Kwak, Yongin-si (KR); Sung-Ho Choi, Suwon-si (KR); Young-Bum Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 750 days.

(21) Appl. No.: 10/777,296

(22) Filed: Feb. 12, 2004

(65) Prior Publication Data

US 2004/0160925 A1    Aug. 19, 2004

(30) Foreign Application Priority Data

Feb. 14, 2003    (KR) ...................... 10-2003-0009393

(51) Int. Cl.
*H04B 7/00* (2006.01)
*H04Q 7/20* (2006.01)

(52) U.S. Cl. ...................... 455/436; 455/443; 455/448; 370/335

(58) Field of Classification Search ................ 455/436, 455/437, 438, 439, 442, 443, 444, 445, 446, 455/447, 450, 453, 449; 370/335
See application file for complete search history.

(56) References Cited

U.S. PATENT DOCUMENTS 7,035,284 B2 *   4/2006   Willenegger et al. ....... 370/470
7,197,021 B2 *   3/2007   Seo et al. ................... 370/335

FOREIGN PATENT DOCUMENTS

| CN | 1336771 | 2/2002 |
|---|---|---|
| CN | 1386336 | 12/2002 |
| EP | 1 313 232 | 5/2003 |
| EP | 1 341 318 | 9/2003 |
| GB | 2 381 166 | 4/2003 |
| WO | WO 02/069664 | 9/2002 |
| WO | WO 03/096598 | 11/2003 |
| WO | WO 2004/045239 | 5/2004 |

* cited by examiner

*Primary Examiner*—Tony T. Nguyen
(74) *Attorney, Agent, or Firm*—The Farrell Law Firm (57) ABSTRACT

A CDMA communication system including a Node B, a UE located in a region of the Node B, a neighbor Node B being adjacent to the Node B and having a soft handover region where the neighbor Node B overlaps with the Node B, and an RNC connected to the Node B and the neighbor Node B. When the UE is located in a non-soft handover region in a region of the Node B, it transmits uplink data to the Node B for a predetermined first transmission time interval. When the UE is located in the soft handover region, it transmits the uplink data to the Node B and the neighbor Node B for a predetermined second transmission time interval.

22 Claims, 5 Drawing Sheets

SYSTEM AND METHOD FOR RETRANSMITTING UPLINK DATA IN A CODE DIVISION MULTIPLE ACCESS COMMUNICATION SYSTEM

PRIORITY

This application claims priority under 35 U.S.C. § 119 to an application entitled "System and Method for Retransmitting Uplink Data in a Code Division Multiple Access Communication System" filed in the Korean Intellectual Property Office on Feb. 14, 2003 and assigned Serial No. 2003-9393, the contents of which are incorporated herein by reference.

BACKGROUND OF THE INVENTION

1. Field of the Invention

The present invention relates generally to a Code Division Multiple Access (CDMA) communication system, and in particular, to a system and method for retransmitting uplink data according to a channel environment of a user equipment (UE).

2. Description of the Related Art

With the development of communication technology, asynchronous CDMA communication systems are evolving into high-speed packet data communication systems such as a High Speed Downlink Packet Access (HSDPA) communication system. The HSDPA communication system represents a communication system supporting a data transmission scheme including control channels related to a high speed-downlink shared channel (HS-DSCH) for supporting high speed downlink packet transmission in a Universal Mobile Telecommunications System (UMTS) communication system chiefly developed in Europe. In order to support the HSDPA scheme, an Adaptive Modulation and Coding (AMC) scheme, a Hybrid Automatic Retransmission Request (HARQ) scheme, and a Fast Cell Section (FCS) scheme have been proposed. A structure of a Wideband Code Division Multiple Access (WCDMA) communication system, i.e., a typical UMTS communication system, will now be descried with reference to FIG. 1.

Figure 1:
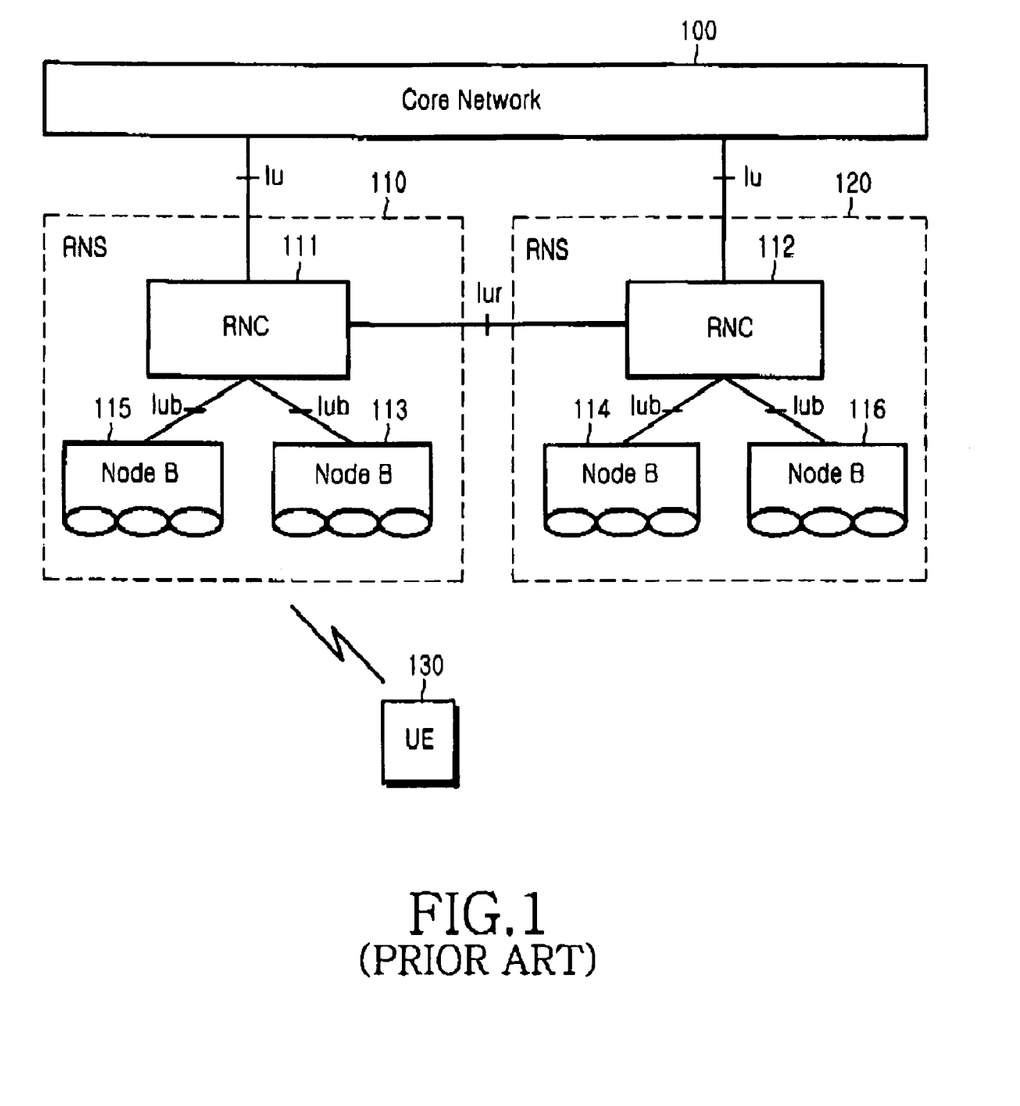
FIG. 1 is a diagram schematically illustrating a structure of a conventional WCDMA communication system.

FIG. 1 is a diagram schematically illustrating a structure of a conventional WCDMA communication system. The WCDMA communication system comprises a core network (CN) 100, a plurality of radio network subsystems (RNSs) 110 and 120, and a user equipment (UE) 130. Each of the RNSs 110 and 120 comprise a radio network controller (RNC) and a plurality of Node Bs (also called "cells" in the following description). More specifically, the RNS 110 comprises an RNC 111 and a plurality of Node Bs 113 and 115, and the RNS 120 comprises an RNC 112 and a plurality of Node Bs 114 and 116. The RNCs are classified as either a Serving RNC (SRNC), a Drift RNC (DRNC), or a Controlling RNC (CRNC), according to their functions. The SRNC and the DRNC are classified according to their functions for each UE. An RNC that manages information on a UE and controls data exchange with a core network is an SRNC, and when data of a UE is transmitted to the SRNC, not directly but via a specific RNC, the specific RNC is called a DRNC of the UE.

The CRNC represents an RNC controlling each of Node Bs. For example, in FIG. 1, if the RNC 111 manages information on the UE 130, it serves as an SRNC of the UE 130, and if data of the UE 130 is transmitted via the RNC 112, due to movement of the UE 130, the RNC 112 becomes a DRNC of the UE 130. The RNC 111 controlling the Node B 113 becomes a CRNC of the Node B 113.

With reference to FIG. 1, a description will now be made of the HARQ scheme, particularly an n-channel Stop And Wait Hybrid Automatic Retransmission Request (n-channel SAW HARQ) scheme. The n-channel SAW HARQ scheme is a newly introduced scheme, which utilizes a soft combining scheme and an HARQ scheme to increase efficiency of a common Stop And Wait Automatic Retransmission Request (SAW ARQ) scheme. The soft combining scheme and the HARQ scheme will now be described below.

1. Soft Combining

In the soft combining scheme, a receiver temporarily stores defective data in a soft buffer and then combines it with retransmitted data of the corresponding data to reduce an error rate. The soft combing scheme is classified into a Chase Combining (CC) scheme and an Incremental Redundancy (IR) scheme.

In the CC scheme, a transmitter transmits data using the same format for both initial transmission and retransmission. If m symbols were transmitted as one coded block for initial transmission, the same m symbols are transmitted as one coded block even for retransmission. The "coded block" refers to user data that is transmitted for one transmit time interval (TTI). That is, in the CC scheme, the same coding rate is also applied to initial transmission and retransmission. Then a receiver combines an initially transmitted coded block with a retransmitted coded block, and performs a cyclic redundancy check (CRC) operation using the combined coded block to detect occurrence of any possible error.

In the IR scheme, a transmitter uses different formats for initial transmission and retransmission. If n-bit user data was generated into m symbols through channel coding, the transmitter transmits only some of the m symbols at initial transmission, and sequentially transmits the remaining symbols at retransmission. That is, a coding rate for initial transmission is different from a coding rate for retransmission. A receiver then forms a coded block with a high coding rate by adding the retransmitted symbols to a rear part of the initially transmitted coded block, and performs error correction on the combined coded block. In the IR scheme, the initial transmission and each of the retransmissions are identified by version numbers. For example, initial transmission is assigned a version number #1, first retransmission is assigned a version number #2, and second retransmission is assigned a version number #3, etc., and the receiver can correctly combine an initially transmitted coded block with a retransmitted coded block using the version information.

In addition, the IR scheme is classified into a partial IR scheme and a full IR scheme. In the partial IR scheme, partial information on a format used for initial transmission is used in the same way during retransmission, and in the full IR scheme, totally different formats are used for initial transmission and retransmission. When the full IR scheme is used, it is possible to acquire a maximum gain with redundancy information, but in a certain full IR scheme, it is impossible to decode received data with only the retransmitted data. Such a characteristic is called a "non-self-decodable" characteristic. When channel coding is performed using a turbo encoder, systematic bits are not punctured during initial transmission. Therefore, if retransmission is performed using the full IR scheme, the systematic bits are not retransmitted. In this case, if the number of bits of retransmission data comprised of only parity bits is not relatively larger than a size (the number) of information bits before channel coding, the retransmission data is not self-decodable. Therefore, when the non-self-decodable retransmission data is transmitted, the receiver should always soft-combine the initially transmitted data with the retransmitted data, for normal data reception.

2. HARQ

In the common SAW ARQ scheme, a Node B does not transmit a next packet until acknowledgement (ACK) information for a previously transmitted packet is received. Because a Node B transmits a next packet only after ACK information for a previous packet is received, the Node B should occasionally wait for the ACK information even though it can currently retransmit a packet. However, in the n-channel SAW HARQ scheme, a Node B can continuously transmit a plurality of packets even before receiving ACK information for a previous packet is received, thereby increasing utilization efficiency of a radio link. That is, in the n-channel SAW HARQ scheme, n logical channels are set up between a UE and a Node B, and are identified by unique time slots or channel numbers, so the UE can determine to which channel a packet received at a particular time belongs. Therefore, the UE can take necessary measures to rearrange packets in a correct order and soft-combine the corresponding packets.

An operation of the n-channel SAW HARQ scheme will now be described in detail with reference to FIG. 1. First, it will be assumed that an n-channel SAW HARQ scheme, particularly a 4-channel SAW HARQ scheme, is performed between a UE 130 and a particular Node B, e.g., a Node B 114, and the 4 channels are uniquely assigned logical identifiers #1 to #4, respectively. In addition, the UE 130 and the Node B 114 include HARQ processors corresponding to the respective channels. The Node B 114 assigns a channel identifier #1 to an initial transmission coded block, before transmitting the initial transmission coded block to the UE 130. The channel identifier can be either uniquely assigned or implied as a unique time slot. If an error has occurred in a coded block transmitted with a channel identifier #1, the UE 130 delivers the defective coded block to an HARQ processor #1 corresponding to the channel identifier #1, and transmits negative ACK (NACK) information to the Node B 114. Then the Node B 114 can transmit a next coded block over a channel #2 regardless of whether the ACK information for a coded block of a channel #1 is received.

If an error has occurred even in the next coded block, the Node B 114 sends even the next coded block to a corresponding HARQ processor. If NACK information for the coded block of the channel #1 is received from the UE 130, the Node B 114 retransmits a corresponding coded block over the channel #1. The UE 130 then senses that the retransmitted coded block is retransmitted data of a coded block previously transmitted over the channel #1 through a channel identifier of the retransmitted coded block, and sends the retransmitted coded block to an HARQ processor #1. Upon receiving the retransmitted coded block, the HARQ processor #1 soft-combines the retransmitted coded block with the initially transmitted coded block already stored therein.

As described above, in the n-channel SAW HARQ scheme, channel identifiers are matched to HARQ processors on a one-to-one basis, so that a Node B can appropriately perform initial transmission and retransmission without delaying user data until ACK information is received.

In order to efficiently use the HARQ scheme in the manner described above, the HSDPA communication system divides the HARQ protocol stack into two layers. That is, in the HSDPA communication system, a soft buffer necessary for soft-combining data and an error correction function are located in a physical layer, and a function of determining ACK/NACK information and determining whether to perform soft combining by receiving ACK/NACK information is located in a media access control (MAC) layer.

A UMTS terrestrial radio access network (UTRAN) comprises a Node B and an RNC as illustrated in FIG. 1. In this structure, a physical layer is located in a Node B, and unlike the conventional MAC layer, a MAC layer of the HSDPA communication system, i.e., a MAC-hs (MAC-high speed) layer, is located in the Node B. The MAC-hs layer is a layer newly proposed for the HSDPA communication system, and controls an ACK/NACK information processing function for supporting the HARQ scheme. The HSDPA communication system locates the ACK/NACK information processing function in a Node B so as to perform fast HARQ processing.

Alternatively, a control operation can be performed so that the ACK/NACK information processing function is located in an RNC, and in this case, ACK/NACK information is delivered to the RNC via a Node B, and the RNC determines whether to perform retransmission depending on the ACK/NACK information provided via the Node B, and sends the determined result back to the Node B. The Node B then actually determines whether to perform data retransmission based on the determined result provided from the RNC. In this case, a delay time required for HARQ signaling (or signaling for performing the HARQ scheme) between a Node B and an RNC occurs. The delay time for HARQ signaling between a Node B and an RNC accounts for one frame, or 2 ms, which is a relatively long delay time. In order to minimize the delay time for HARQ signaling, the HSDPA communication system performs a control operation so that a Node B performs an ACK/NACK information processing function.

Currently, active research is being carried out on an uplink communication system for improving uplink communication efficiency together with the HSDPA communication system. That is, active research is being conducted on an uplink communication system that enables uplink data transmission using an enhanced uplink dedicated channel (EUDCH), which is an uplink data transmission channel. The uplink communication system using EUDCH can apply the data transmission schemes used in the HSDPA communication system. That is, the uplink communication system using EUDCH can employ the AMC scheme and the HARQ scheme adopted in the HSDPA communication system, and can use a relatively shorter TTI than that of the HSDPA communication system. The TTI, as described above, is a unit time interval for which one coded block is transmitted, and scheduling for downlink channels is performed by a Node B to prevent a scheduling delay.

As described above, the uplink communication system using EUDCH transmits data in an uplink direction, and must support the HARQ scheme for the data transmitted in the uplink direction as described in connection with the HSDPA communication system. However, detailed proposals have not been made for the uplink communication system using EUDCH, and detailed proposals for supporting the HARQ scheme also have not been made.

SUMMARY OF THE INVENTION

It is, therefore, an object of the present invention to provide a system and method for retransmitting uplink data in a Code Division Multiple Access (CDMA) communication system.

It is further another object of the present invention to provide a system and method for retransmitting uplink data according to a radio channel environment of a UE in a CDMA communication system.

According to one aspect of the present invention, there is provided a system for transmitting uplink data by a user equipment (UE) in a code division multiple access (CDMA) communication system including a Node B, the UE in a region of the Node B, a neighbor Node B being adjacent to the Node B and having a soft handover region where the neighbor Node B overlaps with the Node B, and a radio network controller (RNC) connected to the Node B and the neighbor Node B. The system comprises: the UE for determining whether the UE exists in a non-soft handover region in a region of the Node B, or in the soft handover region, transmitting the uplink data to the Node B for a predetermined first transmission time interval, if it is determined that the UE exists in the non-soft handover region, and transmitting the uplink data to the Node Bs for a predetermined second transmission time interval if it is determined that the UE exists in the soft handover region; the Node Bs for determining acknowledgement (ACK) information or negative acknowledgment (NACK) information for the uplink data and transmitting the determined ACK information or NACK information to the UE when the UE exists in the non-soft handover region, determining ACK information or NACK information for the uplink data and transmitting the determined ACK information or NACK information to the RNC, if the UE exists in the soft handover region, and after transmitting the ACK information or NACK information, receiving final ACK information or final NACK information for the uplink data from the RNC, and transmitting the received final ACK information and final NACK information to the UE; and the RNC for informing the UE and the Node Bs that the UE exists in the soft handover region upon detecting a fact that the UE exists in the soft handover region, receiving ACK information or NACK information for the uplink data from the Node Bs, determining final ACK information or final NACK information for the uplink data depending on the ACK information or NACK information received from the Node Bs, and transmitting the determined final ACK information and final NACK information to the Node Bs.

According to another aspect of the present invention, there is provided a method for transmitting uplink data by a user equipment (UE) in a code division multiple access (CDMA) communication system including a Node B, the UE in a region of the Node B, a neighbor Node B being adjacent to the Node B and having a soft handover region where the neighbor Node B overlaps with the Node B, and a radio network controller (RNC) connected to the Node B and the neighbor Node B. The method comprises the steps of: determining whether the UE exists in a non-soft handover region in a region of the Node B, or in the soft handover region; transmitting the uplink data to the Node B for a predetermined first transmission time interval, if it is determined that the UE exists in the non-soft handover region; and transmitting the uplink data to the Node B and the neighbor Node B for a predetermined second transmission time interval, if the UE exists in the soft handover region.

According to yet another aspect of the present invention, there is provided a method for transmitting acknowledgement (ACK) information or negative acknowledgement (NACK) information for uplink data transmitted from a user equipment (UE) by a Node B and a neighbor Node B in a code division multiple access (CDMA) communication system including the Node B, the UE in a region of the Node B, the neighbor Node B being adjacent to the Node B and having a soft handover region where the neighbor Node B overlaps with the Node B, and a radio network controller (RNC) connected to the Node B and the neighbor Node B. The method comprises the steps of: determining whether the UE exists in a non-soft handover region in a region of the Node B, or in the soft handover region; determining ACK information or NACK information for the uplink data and transmitting the determined ACK information or NACK information to the UE, if it is determined that the UE exists in the non-soft handover region; determining ACK information or NACK information for the uplink data and transmitting the determined ACK information or NACK information to the RNC, if it is determined that the UE exists in the soft handover region; after transmitting the ACK information or NACK information, receiving final ACK information or final NACK information for the uplink data from the RNC; and transmitting the final ACK information or final NACK information to the UE.

According to yet another aspect of the present invention, there is provided a method for transmitting final acknowledgement (ACK) information or final negative acknowledgement (NACK) information for uplink data transmitted from a user equipment (UE) by a radio network controller (RNC) in a code division multiple access (CDMA) communication system including a Node B, the UE in a region of the Node B, a neighbor Node B being adjacent to the Node B and having a soft handover region where the neighbor Node B overlaps with the Node B, and the RNC connected to the Node B and the neighbor Node B. The method comprises the steps of: upon detecting a fact that the UE exists in the soft handover region, informing the Node B and the neighbor Node B that the UE exists in the soft handover region; after informing that the UE exists in the soft handover region, receiving ACK information or NACK information for the uplink data from the Node B and the neighbor Node B; and determining final ACK information or final NACK information for the uplink data depending on the ACK information or NACK information received from the Node B and the neighbor Node B, and transmitting the determined final ACK information or final NACK information to the Node B and the neighbor Node B.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

Figure 2:
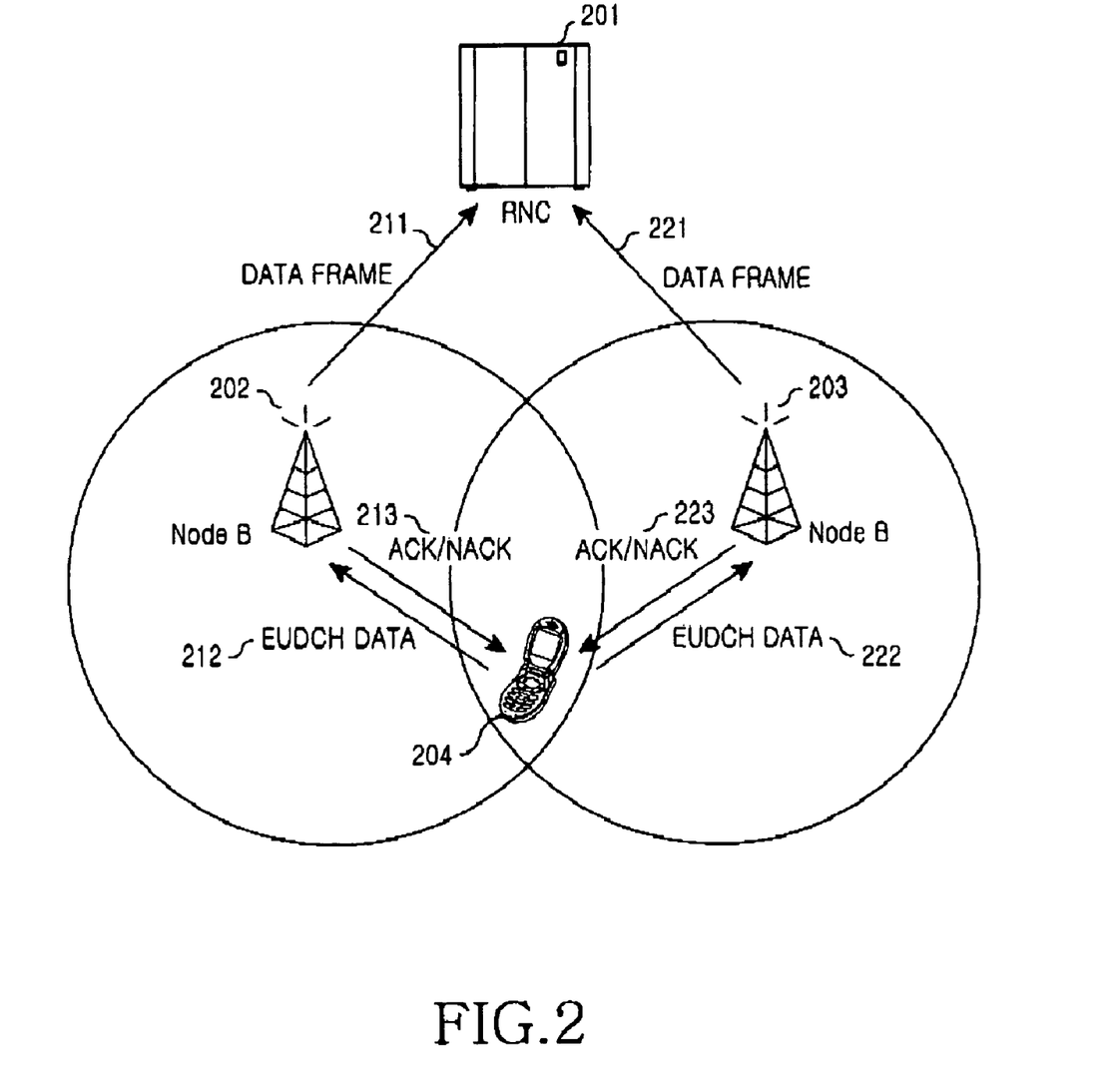
FIG. 2 is a diagram schematically illustrating an uplink communication system using an enhanced uplink dedicated channel (EUDCH) according to an embodiment of the present invention.

FIG. 2 is a diagram schematically illustrating an uplink communication system using an enhanced uplink dedicated channel according to an embodiment of the present invention. Prior to a description of FIG. 2, it should be noted that the uplink communication system using an enhanced uplink dedicated channel (EUDCH) is being researched in order to improve communication efficiency together with a High Speed Downlink Packet Access (HSDPA) communication system as described in the related art section. That is, the uplink communication system enables uplink data transmission using EUDCH, which is an uplink data transmission channel, and the uplink communication system using EUDCH can apply the data transmission schemes used in the HSDPA communication system as described in the related art section. More specifically, the uplink communication system using EUDCH can employ an Adaptive Modulation and Coding (AMC) scheme and a Hybrid Automatic Retransmission Request (HARQ) scheme.

The present invention is directed to the uplink communication system using EUDCH, to which an HARQ scheme among the data transmission schemes used in the HSDPA communication system is applied. When the uplink communication system using EUDCH employs the HARQ scheme, the following should be taken into consideration. A user equipment (UE) transmits data for a transmit time interval (TTI). Then a UMTS terrestrial radio access network (UTRAN) determines whether an error has occurred in data received from the UE. If no error has occurred in the received data, the UTRAN transmits acknowledgement (ACK) information to the UE. However, if an error has occurred in the received data, the UTRAN transmits negative ACK (NACK) information to the UE.

If ACK information is received from the UTRAN, the UE determines that no error has occurred in the transmitted data. However, if NACK information is received from the UTRAN, the UE determines that an error has occurred in the transmitted data. Following the determination that an error has occurred in the transmitted data, the UE retransmits the transmitted data to the UTRAN, and the UTRAN soft-combines the data retransmitted by the UE with the defective data (or errored data) to increase an error correction rate.

The HSDPA communication system is different from the uplink communication system using EUDCH in supporting of soft handover in addition to the fact that the former is a downlink communication system while the latter is an uplink communication system. That is, the HSDPA communication system does not support soft handover, but the uplink communication system using EUDCH does support soft handover. In other words, the HSDPA communication system performs an HSDPA service only in a cell supporting the HSDPA scheme (referred to as "HSDPA cell") and supports the HARQ scheme only for a corresponding channel used for performing the HSDPA service, whereas the uplink communication system using EUDCH supports the HARQ scheme for all corresponding channels when an EUDCH service is simultaneously performed in a plurality of cells. The uplink communication system using EUDCH supports soft handover in order to secure stable data transmission irrespective of the place where UEs exist in the cell, besides high-speed data transmission.

Referring to FIG. 2, it is assumed that a UE 204 is located in an overlapping area, or a soft handover region (SHO), between a service area (or coverage) of a cell, or a Node B 202, and a service area of a Node B 203. When the UE 204 is located in a soft handover region, it transmits data to both the Node B 202 and the Node B 203. As illustrated in FIG. 2, data transmitted in an uplink direction by the UE 204 includes EUDCH data 212 transmitted to the Node B 202 and EUDCH data 222 transmitted to the Node B 203. The "EUDCH data" refers to data transmitted over a EUDCH. However, as described above, in the HSDPA communication system, a function of determining ACK/NACK information for downlink data is located in a UE, and a function of processing ACK/NACK information determined by the UE is located in a Node B. Therefore, it will be assumed that in the uplink communication system using EUDCH, an HARQ function including the ACK/NACK information processing function is located in a Node B like in the HSDPA communication system.

Next, the Node B 202 determines whether an error has occurred in the EUDCH data 212 received from the UE 204. If no error has occurred, the Node B 202 transmits ACK information to the UE 204, and if an error has occurred, the Node B 202 transmits NACK information to the UE 204 (see ACK/NACK 213). It will be assumed in FIG. 2 that no error has occurred in the EUDCH data 212 that the Node B 202 received from the UE 204. Therefore, the Node B 202 transmits ACK information to the UE 204.

Similarly, the Node B 203 determines whether an error has occurred in the EUDCH data 222 received from the UE 204. If no error has occurred, the Node B 203 transmits ACK information to the UE 204, and if an error has occurred, the Node B 203 transmits NACK information to the UE 204 (see ACK/NACK 223). It will be assumed in FIG. 2 that an error has occurred in the EUDCH data 222 that the Node B 203 received from the UE 204. Therefore, the Node B 203 transmits NACK information to the UE 204.

When ACK/NACK information transmitted by the Node B 202 is different from ACK/NACK information transmitted by the Node B 203, i.e., when the Node B 202 transmits ACK information while the Node B 203 transmits NACK information, a radio network controller (RNC) 201 receives only error-free data in order to acquire macro diversity, so the difference in ACK/NACK information transmitted from the Node Bs does not raise any problem. That is, the Node B 202 transmits the EUDCH data 212 received from the UE 204 to the RNC 201 through a data frame 211 of a frame protocol, and the Node B 203 does not transmit the EUDCH data 222 to the RNC 201 because an error has occurred in the received EUDCH data 222. Accordingly, the RNC 201 receives the normal EUDCH data 212 from the Node B 202, and the difference in ACK/NACK information transmitted from the Node Bs does not raise any problem.

However, the UE 204 has a problem when it receives different ACK/NACK information for the same data, i.e., the EUDCH data 212 and the EUDCH data 222. That is, the UE 204 receives ACK information from the Node B 202 and NACK information from the Node B 203, for the EUDCH data 212 and the EUDCH data 222, which are the same data. As the UE 204 receives the opposite ACK/NACK information for the same data, it cannot determine whether to perform retransmission for application of the HARQ scheme.

Conversely, when the UE 204 responds only to the ACK information out of the ACK/NACK information for the EUDCH data 212 and the EUDCH data 222, the HARQ scheme can be applied. However, even when the UE 204 responds only to the ACK information out of the ACK/NACK information for the EUDCH data 212 and the EUDCH data 222, undesirably, data stored in soft buffers of the Node Bs 202 and 203 is not identical. More specifically, because the UE 204 receives ACK information from the Node B 202 and NACK information from the Node B 203, the UE 204 will transmit new EUDCH data. Because the Node B 203 transmitted NACK information for the previously received EUDCH data, the previously received errored EUDCH data is being stored a soft buffer included in the Node B 203. Therefore, the Node B 203 waits for an expected retransmission for the defective EUDCH data.

However, because the UE 204 transmits new EUDCH data rather than the previously transmitted EUDCH data, the UE 204 must inform the Node B 203 that it transmits new EUDCH data instead of the previously transmitted EUDCH data. Therefore, control signaling information indicating transmission of the new EUDCH data is necessary. However, because the UE 204 is located in the soft handover region, its channel environment is usually very poor due to a characteristic of the soft handover region. Therefore, the control signaling information cannot be reliably transmitted. In order to reliably transmit the control signaling information, the UE 204 must transmit the control signaling information at relatively high transmission power, but the control signaling information transmitted at such high transmission power may act as an interference component for other channels. Therefore, an HARQ scheme of the uplink communication system using EUDCH should be implemented in a different way from an HARQ scheme of the existing HSDPA communication system.

Therefore, the present invention newly proposes an HARQ scheme suitable for the uplink communication system using EUDCH. That is, the present invention proposes an HARQ scheme for which both a UE existing in a soft handover region and a UE existing in a non-soft handover (non-SHO) region are taken into consideration. The present invention proposes the following three schemes for the HARQ scheme suitable for the uplink communication system using EUDCH.

In a first scheme, when the UE is located in a soft handover region, a relatively short TTI (hereinafter referred to as "$TTI_{SHORT}$") is applied, and when the UE exists in a non-soft handover region, a relatively long TTI (hereinafter referred to as "$TTI_{LONG}$") is applied.

Because a UE located in a non-soft handover region has a relatively good channel environment, it can perform high-speed data transmission using relatively high transmission power. Therefore, like in the HSDPA communication system, the UE located in the non-soft handover region transmits data at periods of $TTI_{SHORT}$. However, because a UE located in a soft handover region has a relatively poor channel environment, if it uses relatively high transmission power, like the UE located in the non-soft handover region, its coverage is rather reduced undesirably so it transmits data at periods of $TTI_{LONG}$. If the HARQ scheme is performed for the $TTI_{SHORT}$, a delay time required for transmitting and receiving data can be minimized, thus enabling a high-speed HARQ operation. Therefore, it is possible to increase communication efficiency of the uplink communication system using EUDCH.

Alternatively, if the HARQ scheme is performed for the $TTI_{LONG}$, a data transmission/reception delay time becomes longer than when the HARQ scheme is performed for the $TTI_{SHORT}$, but a required HARQ operation time is sufficiently secured, providing an enough time to match ACK/NACK information between Node Bs. By making it possible to vary the TTI according to whether a UE is located in a soft handover region or a non-soft handover region, i.e., whether a channel environment of a UE is good or poor, high-speed data transmission is enabled when a channel environment of a UE is good, and stable data transmission is enabled when a channel environment of a UE is poor.

In a second scheme, when the UE is located in a soft handover region, a function of determining ACK/NACK information is located in an RNC, and when the UE is located in a non-soft handover region, a function of determining ACK/NACK information is located in a Node B.

Before a description of the second scheme is given, it should be noted that an HARQ protocol stack of the HSDPA communication system is divided into two layers, as described in the related art section. To briefly describe this again, in the HSDPA communication system, a soft buffer necessary for soft-combining data and an error correction function are located in a physical layer, and a function of determining ACK/NACK information and determining whether to perform soft combining by receiving ACK/NACK information is located in a media access control (MAC) layer. A UMTS terrestrial radio access network (UTRAN) comprises a Node B and an RNC as illustrated in FIG. 1. In this structure, a physical layer is located in a Node B, and unlike the conventional MAC layer, a MAC layer of the HSDPA communication system, i.e., a MAC-hs (MAC-high speed) layer, is located in the Node B. The MAC-hs layer is a layer newly proposed for the HSDPA communication system, and controls an ACK/NACK information processing function for supporting the HARQ scheme. The HSDPA communication system locates the ACK/NACK information processing function in a Node B so as to perform fast HARQ processing. Alternatively, the ACK/NACK information processing function can be located in an RNC, and in this case, ACK/NACK information is delivered to the RNC via a Node B. The RNC determines whether to perform retransmission depending on the ACK/NACK information provided via the Node B, and sends the determined result back to the Node B. The Node B then actually determines whether to perform data retransmission based on the determined result provided from the RNC. In this case, a delay time required for HARQ signaling (or signaling for performing the HARQ scheme) between a Node B and an RNC occurs. The delay time for HARQ signaling between a Node B and an RNC accounts for one frame, or 2 ms, which is a relatively long delay time. When the TTI is taken into consideration in this way, the delay time delay time for HARQ signaling becomes relatively long. Therefore, in order to minimize the delay time for HARQ signaling compared with the TTI, the HSDPA communication system locates in a Node B an ACK/NACK information processing function, i.e., an HARQ processing function including the ACK/NACK information processing operation.

Therefore, in an embodiment of the present invention, when a UE is located in a non-soft handover region, both a soft-combing/decoding function and a function of determining ACK/NACK information are located in a Node B, and when a UE is located in a soft handover region, the soft-combining/decoding function and the function of determining ACK/NACK information are separately located in a Node B and an RNC, respectively. Of course, when determining ACK/NACK information is performed by an RNC as described in the related art section, ACK/NACK information is transferred to the RNC via a Node B. The RNC determines whether to perform retransmission depending on the ACK/

NACK information provided via the Node B, and sends the determined result back to the Node B. The Node B then actually determines whether to perform data retransmission based on the determined result provided from the RNC, and in this case, a delay time required for HARQ signaling (or signaling for performing the HARQ scheme) between a Node B and an RNC occurs undesirably. However, the present invention solves a problem of the conventional delay time required by an RNC in determining ACK/NACK information by applying the $TTI_{LONG}$ as described in connection with the first scheme.

Figure 3:
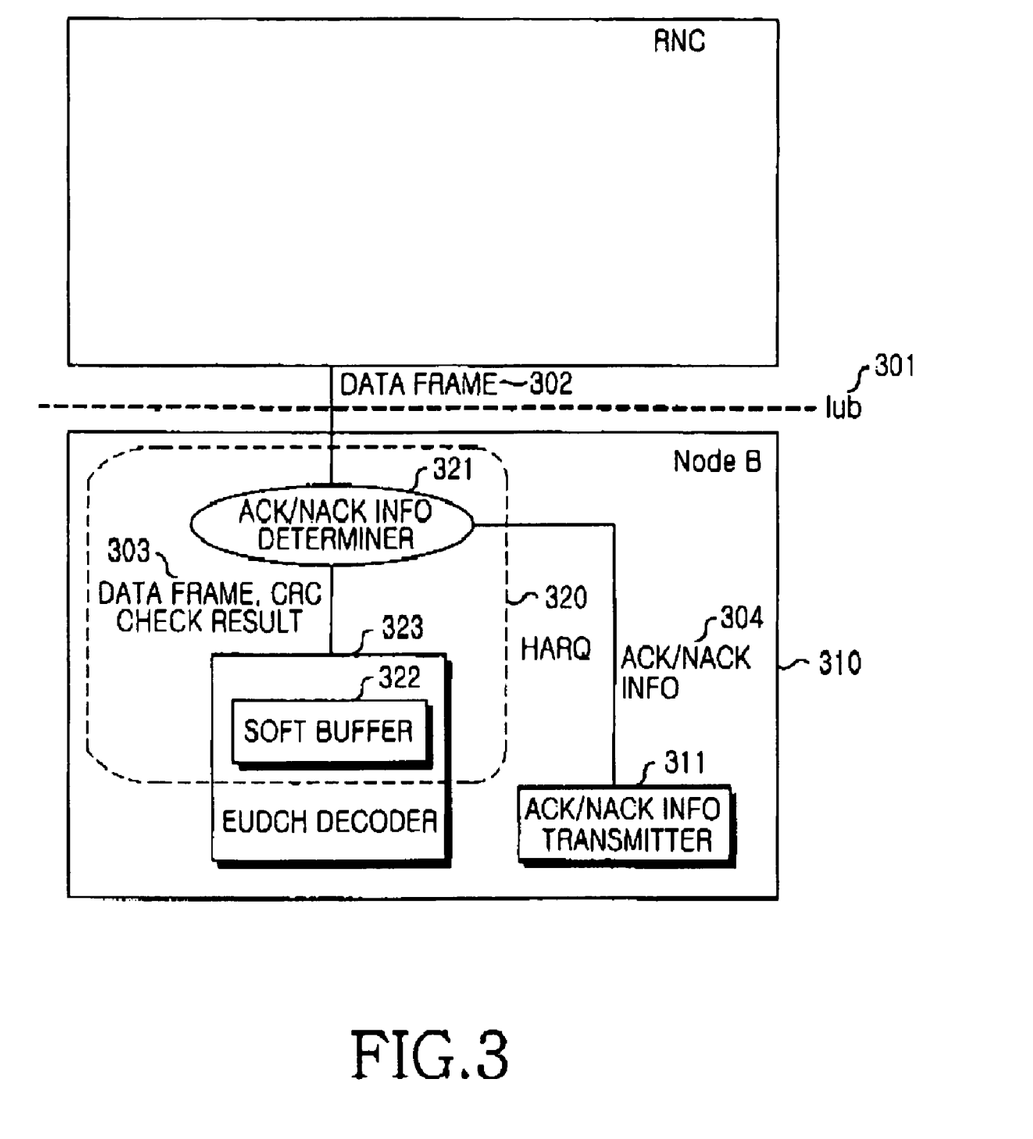
FIG. 3 is a block diagram schematically illustrating an HARQ protocol stack structure when a UE is located in a non-soft handover region.

FIG. 3 is a block diagram schematically illustrating an HARQ protocol stack structure when a UE is located in a non-soft handover region. Referring to FIG. 3, because a UE is located in a non-soft handover region, both soft-combing/decoding and determining ACK/NACK information are performed in a Node B 310. That is, an EUDCH decoder 323 and a soft buffer 322 for the soft-combing/decoding function, an ACK/NACK information determiner 321 for the function of determining ACK/NACK information, and an ACK/NACK information transmitter 311 for transmitting ACK/NACK information determined by the ACK/NACK information determiner 321 to the UE are all located in a Node B 310. If the Node B 310 receives EUDCH data from a UE, the ACK/NACK information determiner 321 determines if an error has occurred in the EUDCH data received from the UE, to thereby determine ACK/NACK information. Here, whether an error has occurred in the EUDCH data received from the UE is determined by the ACK/NACK information determiner 321 based on a cyclic redundancy check (CRC) result. If no error has occurred, the ACK/NACK information determiner 321 determines ACK information, and if an error has occurred, the ACK/NACK information determiner 321 determines NACK information.

After the CRC check, the ACK/NACK information determiner 321 delivers the EUDCH data received from the UE to the soft buffer 322 so that it can be stored in the soft buffer 322 (see "data frame, CRC check result" represented by 303). In addition, the ACK/NACK information determiner 321 sends the determined ACK/NACK information to the ACK/NACK information transmitter 311 (see "ACK/NACK information" represented by 304).

The ACK/NACK information determiner 321 transmits normal EUDCH data to an RNC connected to the Node B 310 through an Iub interface, i.e., a data frame 302 of a frame protocol. The EUDCH decoder 323 decodes the EUDCH data received from the UE according to a predetermined decoding scheme.

Figure 4:
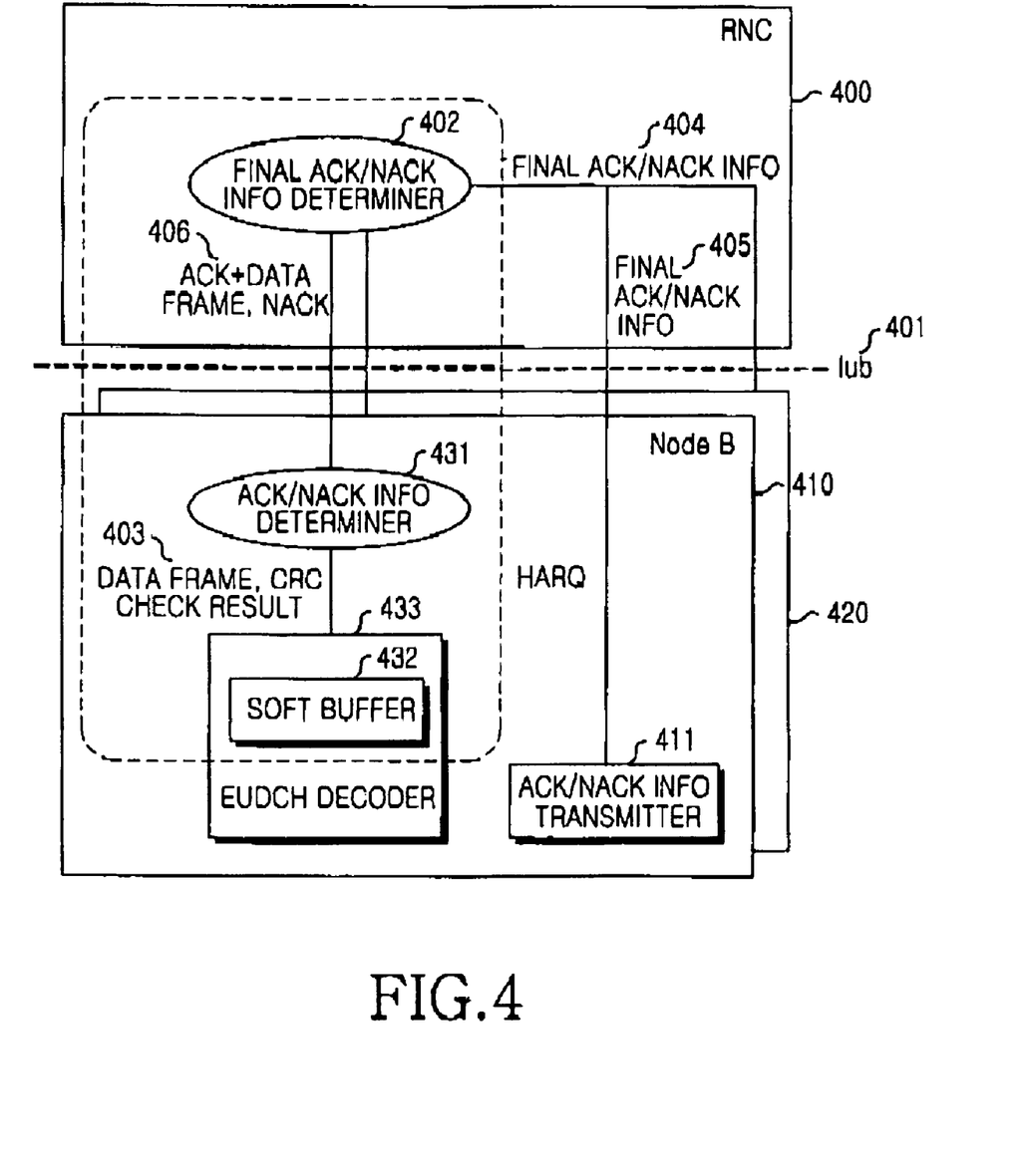
FIG. 4 is a block diagram schematically illustrating an HARQ protocol stack structure when a UE is located in a soft handover region.

FIG. 4 is a block diagram schematically illustrating an HARQ protocol stack structure when a UE is located in a soft handover region. Before a description of FIG. 4 is given, it will be assumed that because a UE is located in a soft handover region between a Node B 410 and a Node B 420, the Node B 410 and the Node 420 are controlled by the same RNC 400. Referring to FIG. 4, because the UE is located in a soft handover region, a soft-combing/decoding function and an HARQ function of determining ACK/NACK information are separately located in the Node Bs 410 and 420 and the RNC 400, respectively. The HARQ-related functions independently existing in the Node Bs 410 and 420 are identical to each other, so a description thereof will be made with reference to only the Node B 410, for simplicity. A soft buffer 432 and an EUDCH decoder 433 for the soft-combining/decoding function, an ACK/NACK information determiner 431 for the function of determining ACK/NACK information, and an ACK/NACK information transmitter 411 for transmitting ACK/NACK information determined by a final ACK/NACK information determiner 402 to the UE are located in the Node B 410, and the final ACK/NACK information determiner 402 is located in the RNC 400. Here, even the Node B includes the ACK/NACK information determiner 431. The ACK/NACK information determiner 431 generates ACK/NACK information for the EUDCH data transmitted by the UE, but the ACK/NACK information generated in the ACK/NACK information determiner 431 is not transmitted to the UE.

If the Node B 410 receives EUDCH data from a UE, the ACK/NACK information determiner 431 determines whether an error has occurred in the EUDCH data received from the UE, to thereby determine ACK/NACK information. Here, whether an error has occurred in the EUDCH data received from the UE is determined by the ACK/NACK information determiner 431, based on a CRC check result on the received EUDCH data. As a result of the CRC check, if no error has occurred, the ACK/NACK information determiner 431 determines ACK information. If an error has occurred, the ACK/NACK information determiner 431 determines NACK information.

After the CRC check, the ACK/NACK information determiner 431 delivers the EUDCH data received from the UE to the soft buffer 432 so that it can be stored in the soft buffer 432 (see "data frame, CRC check result" represented by 403). When the EUDCH data received from the UE is normal, the ACK/NACK information determiner 431 transmits ACK information and the received EUDCH data to the RNC 400 through an Iub interface, i.e., a data frame of a frame protocol. However, if the EUDCH data received from the UE is defective, the ACK/NACK information determiner 431 delivers ACK information to the RNC 400 (see "ACK+ data frame/NACK" represented by 406).

Next, the final ACK/NACK information determiner 402 in the RNC 400 generates ACK/NACK information for the EUDCH data received from the UE depending on the ACK/NACK information provided respectively from the Node B 410 and the Node B 420. The final ACK/NACK information determiner 402 analyzes ACK/NACK information provided respectively from the Node B 410 and the Node B 420. If NACK information is received from both the Node B 410 and the Node B 420, the final ACK/NACK information determiner 402 determines NACK information for the EUDCH data received from the UE. However, if ACK information is received from any one of the Node Bs 410 and 420, the final ACK/NACK information determiner 402 determines ACK information for the EUDCH data received from the UE. The final ACK/NACK information determiner 402 transmits the final ACK/NACK information determined for the EUDCH data received from the UE to the Node B 410 and the Node B 420 using a control frame of a frame protocol (see "final ACK/NACK information" represented by 404 and 405). Then, ACK/NACK information transmitters of the Node Bs 410 and 420 transmit the ACK/NACK information received from the final ACK/NACK information determiner 402 to the UE. For example, the ACK/NACK information transmitter 411 of the Node B 410 transmits the ACK/NACK information received from the final ACK/NACK information determiner 402 to the UE. The EUDCH decoder 433 decodes the EUDCH data received from the UE according to a predetermined decoding scheme.

Figure 5:
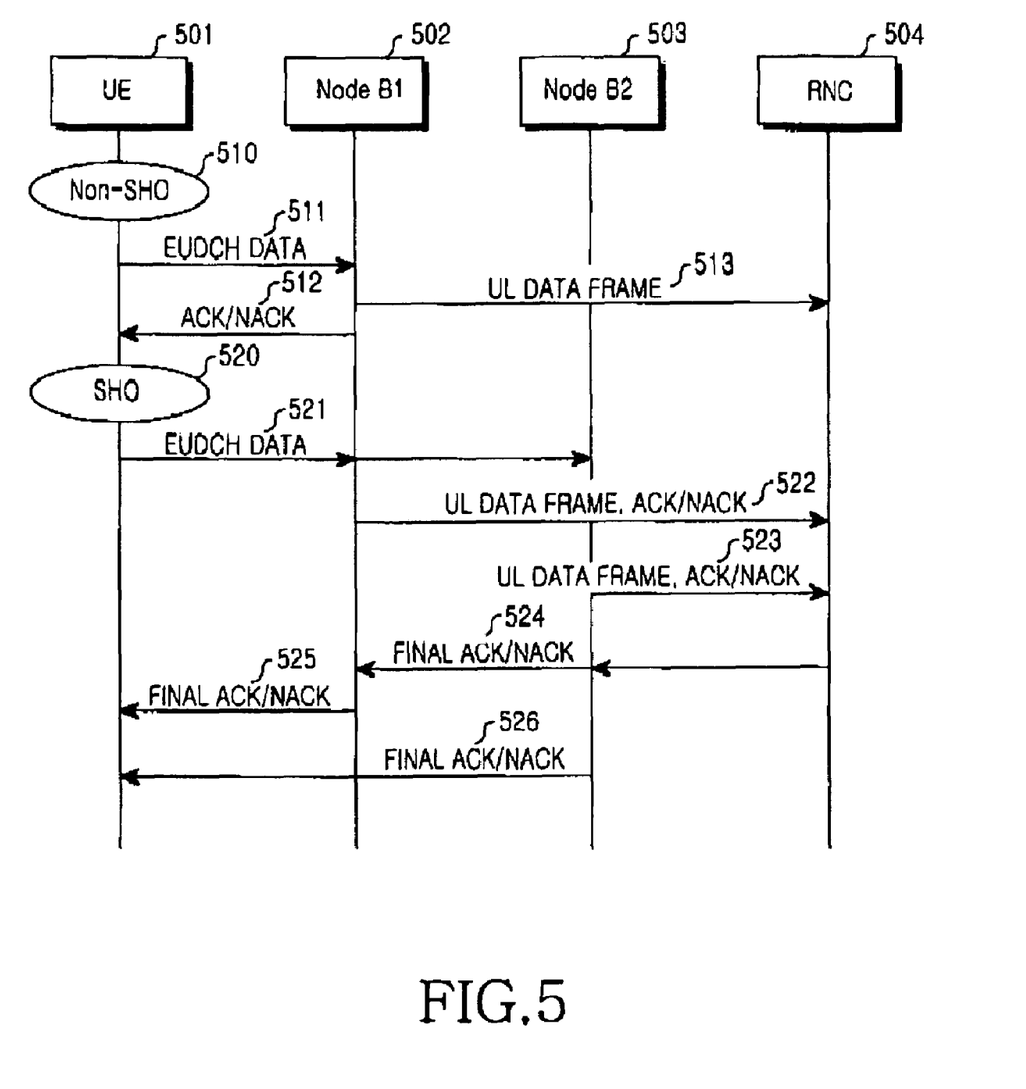
FIG. 5 is a signal flow diagram schematically illustrating a procedure for performing an HARQ scheme in an uplink communication system using EUDCH according to an embodiment of the present invention.

FIG. 5 is a signal flow diagram schematically illustrating a procedure for performing an HARQ scheme in an uplink communication system using EUDCH according to an embodiment of the present invention. Before a description of FIG. 5 is given, it should be noted that because a detailed channel structure and frame protocol for an uplink communication system using EUDCH have not been specified yet, the procedure will be described with reference to parameters related to the HARQ scheme proposed in the present invention, and a detailed description of the other parts will be omitted.

Referring to FIG. 5, a UE 501 is located in a non soft-handover region (non-SHO), i.e., a cell where a Node B#1 502 provides a service (Step 510), and transmits EUDCH data to the Node B#1 502 (Step 511). At this point, because the UE 501 is located in a non-soft handover region, all HARQ functions, i.e., a soft-combining/decoding function and a function of determining ACK/NACK information, are performed in the Node B#1 502, and because an HARQ scheme is directly performed in a Node B, TTI is also set to $TTI_{SHORT}$. The Node B#1 502 performs CRC check on the EUDCH data received from the UE 501, and determines ACK/NACK information for the EUDCH data received from the UE 501 depending on the CRC check result. The Node B#1 502 transmits the determined ACK/NACK information to the UE 501 (Step 512). As a result of the CRC check, if the EUDCH data received from the UE 501 is error-free, i.e., if ACK information is determined, the Node B#1 502 transmits the EUDCH data received from the UE 501 to an RNC 504 through an uplink (UL) data frame (Step 513).

The UE 501 can move from the cell where the Node B#1 502 provides a service, i.e., the non-soft handover region, to a soft handover (SHO) region, or a boundary region of another cell where a Node B#2 503 provides a service (Step 520). In order to include the Node B#2 503 in an active set of the UE 501, the RNC 504 of the UE 501 transmits an Active Set Update message, which is an upper layer signaling message to the UE 501. The Active Set Update message includes a handover command and an activation time when the UE 501 is to perform handover, or to enter the soft handover region. The UE 501 then simultaneously performs handover, resets TTI from $TTI_{SHORT}$ to $TTI_{LONG}$ at the activation time, and transmits EUDCH data (Step 521).

Because the UE 501 now is located in a soft handover region, HARQ functions are separately performed in the Node Bs 502 and 503 and the RNC 504. That is, a soft-combining/decoding function is performed in the Node Bs 502 and 503, and a function of determining ACK/NACK information is performed in the RNC 504. Further, because an HARQ scheme is performed in an RNC, the TTI is also set to $TTI_{LONG}$ as described above. In addition, because the Node Bs 502 and 503 cannot detect a fact that the UE 501 is located in a soft handover region, the RNC 504 informs the Node Bs 502 and 503 that the UE 501 is located in a soft handover region.

Herein, the RNC 504 informs the Node Bs 502 and 503 that the UE 501 is located in a soft handover region, using a control frame of a frame protocol. The control frame includes information indicating that the UE 501 enters a soft handover region, and information on the activation time, or a time at which the UE 501 enters the soft handover region. If a control frame is received from the RNC 504, the Node Bs 502 and 503 determine that the UE 501 is located in a soft handover region from a time corresponding to the time information, i.e., the activation time, set the TTI to $TTI_{LONG}$, suspend the functions of determining ACK/NACK information which were separately performed in the Node Bs 502 and 503, and operate according to the ACK/NACK information determined by the RNC 504. In addition, because the UE 501 is located in the soft handover region, it transmits the EUDCH data to both the Node B#1 502 and the Node B#2 503 (Step 521).

The Node B#1 502 performs CRC check on the EUDCH data received from the UE 501, and determines ACK/NACK information for the EUDCH data received from the UE 501 depending on the CRC check result. If the EUDCH data received from the UE 501 is error-free, the Node B#1 502 transmits the received EUDCH data along with ACK information to the RNC 504 through an uplink data frame. However, if there is an error in the EUDCH data received from the UE 501, the Node B#1 502 transmits only NACK information to the RNC 504 (Step 522). Similarly, the Node B#2 503 performs CRC check on the EUDCH data received from the UE 501, and determines ACK/NACK information for the EUDCH data received from the UE 501 depending on the CRC check result. If the EUDCH data received from the UE 501 is error-free, the Node B#2 503 transmits the received EUDCH data along with ACK information to the RNC 504 through an uplink data frame. However, if there is an error in the EUDCH data received from the UE 501, the Node B#2 503 transmits only NACK information to the RNC 504 (Step 523).

Herein, when the UE 501 is located in a non-soft handover region, the Node B#1 502 and the Node B#2 503 transmit ACK/NACK information for the EUDCH data received from the UE 501 directly to the UE 501. However, when the UE 501 is located in a soft handover region, the Node B#1 502 and the Node B#2 503 transmit ACK/NACK information for the EUDCH data received from the UE 501 not directly to the UE 501 but to the RNC 504.

The RNC 504 separately receives ACK/NACK information from the Node B#1 502 and the Node B#2 503, determines ACK/NACK information according to the received ACK/NACK information, and transmits the determined ACK/NACK information to the Node B#1 502 and the Node B#2 503 (Step 524). As described in connection with FIG. 4, when NACK information is received from both the Node B#1 502 and the Node B#2 503, the RNC 504 determines NACK information for the EUDCH data received from the UE 501, and when ACK information is received from any one of the Node B#1 502 and the Node B#2 503, the RNC 504 determines ACK information for the EUDCH data received from the UE 501. The Node B#1 502 determines final ACK/NACK information corresponding to the ACK/NACK information received from the RNC 504, and transmits the determined final ACK/NACK information to the UE 501 (Step 525). Similarly, the Node B#2 503 determines final ACK/NACK information corresponding to the ACK/NACK information received from the RNC 504, and transmits the determined final ACK/NACK information to the UE 501 (Step 526). As described above, when the UE 501 is located in soft handover region, the HARQ-related functions are distributed to the Node Bs 502 and 503 and the RNC 504, so that the RNC 504 receives error-free EUDCH data from one or both of the Node Bs 502 and 503, thereby acquiring macro diversity. Further, the UE 501 receives the same ACK/NACK information from the Node Bs 502 and 503, so it can perform a normal HARQ scheme.

As described above, a UE receives ACK/NACK information for EUDCH data that the UE transmitted. Then the UE does not perform a separate operation when ACK information is received, and performs retransmission on the transmitted EUDCH data when NACK information is received.

A description will now be made of a third scheme necessary for an HARQ scheme suitable for an uplink communication system using EUDCH according to an embodiment of the present invention.

In the third scheme, when a UE is located in a non-soft handover region, a Chase Combining (CC) scheme and an Incremental Redundancy (IR) scheme are used as a soft combining scheme. When the UE is located in a soft handover region, the CC scheme and an IR scheme with restricted version number are used. The "restricted version number" refers to a self-decodable version number among version numbers. The term "self-decodable" means that when data is received, decoding of error-free data is possible using only the corresponding data as described in the related art section. In actual implementation, when channel coding is performed, whether data is self-decodable is determined depending on a coding rate and an IR version number.

When a UE is located in a soft handover region, the UE is located in cell boundary regions of a plurality of Node Bs, increasing possibility that its channel environment will become poor. Therefore, when a UE is located in a soft handover region, Node Bs may receive defective data or fail to receive the data transmitted from the UE. When the Node Bs fail to receive the data transmitted from a UE, the UE retransmits the data using a non-self-decodable version number. At this point, because the Node B that failed to receive the data transmitted from the UE has no data buffered for soft combining on the corresponding data, there is high possibility that an error will occur again. In order to prevent reoccurrence of an error, in an embodiment of the present invention, only a self-decodable version number is used as a version number of retransmission data when the UE is located in a soft handover region. By retransmitting data using only a self-decodable version number in this way, Node Bs can normally receive data even though there is no data to be subject to soft combining.

As can be appreciated from the forgoing description, in an uplink communication system using EUDCH, the present invention distributes HARQ-related functions to a Node B and an RNC according to whether a UE is located in a soft handover region or a non-soft handover region, thereby enabling stable uplink data retransmission. In addition, when the UE is located in a soft handover region, a time required for determining ACK/NACK information is sufficiently secured by adjusting TTI for a time delay which may occur because an RNC determines ACK/NACK information for uplink data, thereby contributing to stable uplink data retransmission.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting uplink data by a user equipment (UE) in a code division multiple access (CDMA) communication system including a Node B, the UE is located in a region of the Node B, a neighbor Node B being adjacent to the Node B and having a soft handover region where the neighbor Node B overlaps with the Node B, and a radio network controller (RNC) connected to the Node B and the neighbor Node B, the method comprising the steps of:

determining whether the UE is located in one of a non-soft handover region of the Node B, and in the soft handover region;

transmitting the uplink data to the Node B for a predetermined first transmission time interval, if it is determined that the UE is located in the non-soft handover region; and transmitting the uplink data to the Node B and the neighbor Node B for a predetermined second transmission time interval, if it is determined that the UE is located in the soft handover region.

2. The method of claim 1, wherein the predetermined second transmission time interval is longer than the first transmission time interval.

3. The method of claim 1, further comprising the step of retransmitting the uplink data to the Node B upon receiving negative acknowledgement (NACK) information for the uplink data from the Node B, when the UE is located in the non-soft handover region.

4. The method of claim 3, wherein the step of retransmitting the uplink data comprises one of the steps of retransmitting the uplink data as was initially transmitted, and retransmitting a part of the initially transmitted uplink data.

5. The method of claim 1, further comprising the step of retransmitting the uplink data to the Node B and the neighbor Node B upon receiving NACK information for the uplink data from the Node B and the neighbor Node B, when the UE is located in the soft handover region.

6. The method of claim 5, wherein the step of retransmitting the uplink data comprises one of the steps of retransmitting the uplink data as was initially transmitted, and retransmitting a self-decodable part of the initially transmitted uplink data.

7. The method of claim 1, wherein the step of determining whether the UE is located in one of the non-soft handover region and the soft handover region comprises the step of determining whether information indicating that the UE enters the soft handover region is received from the RNC.

8. A method for transmitting acknowledgement (ACK) information and negative acknowledgement (NACK) information for uplink data transmitted from a user equipment (UE) by a Node B and a neighbor Node B in a code division multiple access (CDMA) communication system including the Node B, the UE being located in a region of the Node B, the neighbor Node B being adjacent to the Node B and having a soft handover region where the neighbor Node B overlaps with the Node B, and a radio network controller (RNC) connected to the Node B and the neighbor Node B, the method comprising the steps of:

determining whether the UE is located in one of a non-soft handover region of the Node B, and in the soft handover region;

determining ACK/NACK information for the uplink data and transmitting the determined ACK/NACK information to the UE, if it is determined that the UE is located in the non-soft handover region;

determining the ACK/NACK information for the uplink data and transmitting the determined ACK/NACK information to the RNC, if it is determined that the UE is located in the soft handover region;

after transmitting the ACK/NACK information, receiving final ACK/NACK information for the uplink data from the RNC; and transmitting the final ACK/NACK information to the UE.

9. The method of claim 8, wherein the step of determining whether the UE is located in one of the non-soft handover and the soft handover region comprises the step of determining whether information indicating that the UE enters the soft handover region is received from the RNC.

10. The method of claim 9, wherein the information indicating that the UE enters the soft handover region is received through a control frame of a frame protocol.

11. A method for transmitting final acknowledgement (ACK) information and final negative acknowledgement (NACK) information for uplink data transmitted from a user equipment (UE) by a radio network controller (RNC) in a code division multiple access (CDMA) communication system including a Node B, the UE being located in a region of the Node B, a neighbor Node B being adjacent to the Node B and having a soft handover region where the neighbor Node B overlaps with the Node B, and the RNC being connected to the Node B and the neighbor Node B, the method comprising the steps of:

upon detecting that the UE is located in the soft handover region, informing the Node B and the neighbor Node B that the UE is located in the soft handover region;

after informing that the UE is located in the soft handover region, receiving ACK/NACK information for the uplink data from the Node B and the neighbor Node B;

determining the final ACK/NACK information for the uplink data depending on the ACK/NACK information received from the Node B and the neighbor Node B; and transmitting the determined final ACK/NACK information to the Node B and the neighbor Node B.

12. The method of claim 11, wherein the step of determining the final ACK/NACK information for the uplink data comprises the step of determining the final ACK information for the uplink data when the ACK information is received from at least one of the Node B and the neighbor Node B.

13. The method of claim 11, wherein the step of determining the final ACK/NACK information for the uplink data comprises the step of determining the final NACK information for the uplink data when no ACK information is received from both the Node B and the neighbor Node B.

14. The method of claim 11, wherein the step of informing that the UE is located in the soft handover region comprises the step of transmitting information indicating that the UE is located in the soft handover region, through a control frame of a frame protocol.

15. A system for transmitting uplink data by a user equipment (UE) in a code division multiple access (CDMA) communication system, and, comprising:

a node B;

a neighbor Node B being adjacent to the Node B and having a soft handover region where the neighbor Node B overlaps with the Node B;

a radio network controller (RNC) connected to the Node B and the neighbor Node B; and a UE for determining whether the UE is located in one of a non-soft handover region of the Node B, and in the soft handover region, transmitting the uplink data to the Node B for a predetermined first transmission time interval, if it is determined that the UE is located in the non-soft handover region, and transmitting the uplink data to the Node B and the neighbor Node B for a predetermined second transmission time interval, if it is determined that the UE exists in the soft handover region;

wherein the Node B and the neighbor Node B (a) determine acknowledgement (ACK) information and negative acknowledgment (NACK) information for the uplink data, (b) transmit the determined ACK/NACK information to the UE when the UE is located in the non-soft handover region, (c) transmit the determined ACK/NACK information the RNC, if the UE is located in the soft handover region, (d) after transmitting the determined ACK/NACK information, receive final ACK/NACK information for the uplink data from the RNC, and (e) transmit the received final ACK/NACK information to the UE; and wherein the RNC (f) informs the UE, the Node B, and the neighbor Node B that the UE is located in the soft handover region, upon detecting that the UE is located in the soft handover region, (g) receives the ACK/NACK information for the uplink data from the Node B and the neighbor Node B, (h) determines the final ACK/NACK information for the uplink data depending on the ACK/NACK information received from the Node B and the neighbor Node B, and (i) transmits the determined final ACK/NACK information to the Node B and the neighbor Node B.

16. The system of claim 15, wherein the predetermined second transmission time interval is longer than the first transmission time interval.

17. The system of claim 15, wherein the UE retransmits the uplink data to the Node B upon receiving the NACK information for the uplink data from the Node B, when the UE is located in the non-soft handover region.

18. The system of claim 17, wherein the UE retransmits one of the uplink data as was initially transmitted, and a part of the initially transmitted uplink data.

19. The system of claim 15, wherein the UE retransmits the uplink data to the Node B and the neighbor Node B upon receiving the final NACK information for the uplink data from the Node B and the neighbor Node B, when the UE is located in the soft handover region.

20. The system of claim 19, wherein the UE retransmits one of the uplink data as was initially transmitted, and a self-decodable part of the initially transmitted uplink data.

21. The system of claim 15, wherein the RNC informs that the UE is located in the soft handover region, through a control frame of a frame protocol.

22. The system of claim 15, wherein the RNC determines the final ACK information for the uplink data when the ACK information is received from at least one of the Node B and the neighbor Node B, and determines the final NACK information for the uplink data when the RNC fails to receive the ACK information from both the Node B and the neighbor Node B.

* * * * *